United States Patent [19] [11] 3,882,175
Kominami et al. [45] May 6, 1975

[54] PROCESS FOR THE PREPARATION OF N,N-DIALKYLFORMAMIDES

[75] Inventors: Naoya Kominami; Yohei Fukouoka; Katuyoshi Sasaki, all of Tokyo, Japan

[73] Assignee: Asahi Kasei Kogyo Kabushiki Kaisha, Osaka, Japan

[22] Filed: Aug. 25, 1971

[21] Appl. No.: 174,923

[30] Foreign Application Priority Data
Aug. 29, 1970 Japan.............................. 45-75271
Dec. 15, 1970 Japan............................. 45-111225
Dec. 15, 1970 Japan............................. 45-111226

[52] U.S. Cl............................................. 260/561 R
[51] Int. Cl............................................ C07c 103/30
[58] Field of Search ................................. 260/561 R

[56] References Cited
UNITED STATES PATENTS

| | | | |
|---|---|---|---|
| 2,457,660 | 12/1948 | Gresham et al................. | 260/561 R |
| 2,476,500 | 7/1949 | Mahan ........................... | 260/561 R |
| 3,674,851 | 7/1972 | Senoo et al. .................... | 260/561 R |
| 3,751,465 | 8/1973 | Takahashi et al............... | 260/561 R |

FOREIGN PATENTS OR APPLICATIONS

| | | | |
|---|---|---|---|
| 796,572 | 6/1958 | United Kingdom............. | 260/561 R |
| 718,759 | 11/1954 | United Kingdom............. | 260/561 R |
| 1,009,614 | 11/1957 | Germany........................ | 260/561 R |

OTHER PUBLICATIONS
Hamamoto et al., Chem. Abstracts, 1961, 4349d.

*Primary Examiner*—Lewis Gotts
*Assistant Examiner*—Ethel G. Love
*Attorney, Agent, or Firm*—Milton J. Wayne

[57] ABSTRACT

An improved process for the preparation of N,N-dialkylformamides useful as solvents by the reaction of hydrocyanic acid with an alcohol represented by the formula ROH wherein R is an alkyl group having 1 to 4 carbon atoms, characterized in that the reaction is effected at 150°–270°C. in the presence of water and a catalyst comprising at least one of the titanium compounds, said water being present at the time of initiation of reaction in an amount of 0.1–10 moles per mole of the hydrocyanic acid. The yield of N,N-dialkylformamide is remarkably improved in the present process as compared with that in the prior process starting from the same reactants. The present process can be advantageously modified. One modification consists in the process in which the reaction is effected first at 150°14–200°C. until substantially all of the hydrocyanic acid disappears or is converted and subsequently at 210°–270°C. in two stages. Another modification consists in the process in which the titanium compound is employed in the form as treated with an ammonium or methylamine salt of an inorganic acid. Such modifications give a further improved yield of the desired N,N-dialkylformamide.

1 Claim, No Drawings

PROCESS FOR THE PREPARATION OF N,N-DIALKYLFORMAMIDES

This invention relates to an improvement in the preparation of an N,N-dialkylformamide from hydrocyanic acid and an alcohol.

More particularly, this invention is concerned with an improved process for the preparation of an N,N-dialkylformamide by the reaction of hydrocyanic acid with an alcohol represented by the formula ROH wherein R represents an alkyl group having 1 to 4 carbon atoms, characterized in that the reaction is effected by heating at temperatures of 150°–270°C. in the presence of water and a catalyst comprising at least one titanium compound.

N,N-dialkylformamides are industrially important compounds which are useful as solvents for various purposes such as extraction and as solvents in reaction media. Examples of these important N,N-dialkylformamides include N,N-dimethylformamide and N,N-diethylformamide.

Heretofore, it has been proposed in the art to prepare N,N-dialkylformamides by the reaction of a dialkylamine with one of several classes of compounds such as a formic acid ester, formic acid and carbon monoxide. We have proposed a new process for the preparation of a N,N-dialkylformamide from hydrocyanic acid and an alcohol (See French Patent No. 1,576,256), which process is commercially advantageous since the desired N,N-dialkylformamide can be produced in a single stage from very inexpensive materials, i.e. hydrocyanic acid and an alcohol. However, this process has still some problems to be improved, particularly of the unsastisfactory yield of N,N-dialkylformamides in relation to the starting hydrocyanic acid.

Then, as a result of our studies on the improvement in the yield of the above-mentioned process in order to further increase the industrial utilizability thereof, it has been found that there are two major grounds for the unsatisfactory yield as set forth below. One ground is due to the instability of hydrocyanic acid. As is well known in the art, hydrocyanic acid, the properties of which are different from those of other nitriles, tends to form a solid mass in the presence of an acid or alkali through the reaction therewith. Such a side reaction of hydrocyanic acid may frequently occur in the above-mentioned process, thereby yielding a large amount of the solid mass, which leads to lowering of the yield of the desired N,N-dialkylformamides. Another reason for reduced yields is due to the instability of the desired product. In the above-mentioned process, the reaction must be effected at an elevated temperature in order to accelerate the main reaction that could yield the desired N,N-dialkylformamide and thus improve the yield thereof. Under such a condition, however, the desired product is unstable and, at the same time, side reactions such as a decomposition reaction and the like are promoted, which leads to lowering of the yield of the desired product. These two grounds are not noted in the preparation of N,N-dialkyl substituted fatty amides by the reaction of an alkyl nitrile, instead of the hydrocyanic acid, with the alcohol.

As a result of our further and extensive studies to overcome those disadvantages inherent in the above-mentioned process, it has now been found that the reaction of hydrocyanic acid with the alcohol to produce a N,N-dialkylformamide can be advantageously effected at temperatures of 150°–270°C. in the presence of water and a catalyst comprising at least one titanium compound. This invention has been made on the basis of the above findings.

It is, accordingly, a primary object of this invention to provide an improved and advantageous process for the preparation of N,N-dialkylformamides.

Other objects and advantages of this invention will become apparent to those skilled in the art from the following description of this invention.

Essentially, according to the present invention, there is provided a process for the preparation of an N,N-dialkylformamide by reacting hydrocyanic acid with an alcohol represented by the formula ROH wherein R represents an alkyl group having 1 to 4 carbon atoms, characterized in that the reaction is effected at temperatures of 150°–270°C. in the presence of water and a catalyst comprising at least one of titanium compounds, said water being present at the time of initiation of reaction in an amount of 0.1–10 moles per mole of the hydrocyanic acid.

As stated supra, one feature of this invention involves conducting the reaction in the presence of water; a second one is that the reaction is effected at relatively low temperatures of 150°–270°C. and a third one is the use of a titanium compound as a catalyst. These are essential features of this invention. The illustrative and detailed explanation is given on such essential features in order as follows:

By reacting hydrocyanic acid with an alcohol in the presence of water, according to the present invention, not only the side reaction of hydrocyanic acid is extremely depressed but also the main reaction is promoted, so that the yield of the desired N,N-dialkylformamide is remarkably improved. The present reaction between hydrocyanic acid and an alcohol is complicated and considered to proceed through various routes, but can be eventually represented by the following reaction formula:

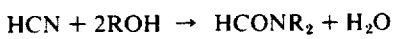

$$HCN + 2ROH \rightarrow HCONR_2 + H_2O$$

(wherein R represents an alkyl group having 1 to 4 carbon atoms).

The water obtained as a by-product possibly has a favorable effect on the reaction. Yet, in the process of this invention, the presence of water at the time of initiation of the reaction has a specific favorable effect, that is, the side reaction of hydrocyanic acid is depressed and the main reaction is promoted. The reaction mixture is obtained in the form of a substantially colorless, clear liquid, as distinguished from the procedure conducted in the absence of water in which a brown solid mass is obtained as product. For this reason, the subsequent operations, e.g. isolation and purification are facilitated. Such favorable effect due to the addition of water in the reaction system can be observed only in case where the alcohol is reacted with hydrocyanic acid, but are not observed in cases where the alcohol is reacted with an alkyl nitrile. Moreover, it should be noted that, in case the alcohol is reacted with an alkyl nitrile, the addition or presence of water has an adverse effect on the reaction and, as distinguished from the process of the present invention, the removal of water is required to obtain an increased yield of the desired product.

In the process of this invention, the reaction is effected at temperatures of 150°–270°C., so that the favorable effect due to the addition of water and the suitable rate of reaction are simultaneously obtained. Stated illustratively, the reaction rate is extremely low at temperatures of below 150°C., while at temperatures of above 270°C. the side reaction is promoted to destroy the effect due to the presence of water.

The use of a titanium compound as a catalyst makes the effects of the addition of water and the specific temperatures to definitely develop. In other words, without employing as a catalyst a titanium compound the favorable effects of the addition of water and the specific temperatures can not be obtained. Other catalysts than a titanium compound, e.g., a zinc compound and an iron compound are superior in effect on the reaction of hydrogen cyanide and the alcohol to the titanium compound, if the reaction is conducted in the absence of water. However, even if the reaction is conducted in the presence of a catalyst such as a zinc compound or an iron compound and under the same conditions as in the present invention, i.e. in the presence of water and at temperatures of 150°-270°C., the specific favorable effects due to the addition of water and the specific temperatures is not obtained. Accordingly, with such a zinc compound or an iron compound catalyst, there is obtained the desired N,N-dialkylformamide in a greatly reduced yield, as compared with that of the present process wherein a titanium compound is necessarily employed as a catalyst. In case a catalyst is not employed, the effect of this invention is, of course, not obtained. As described, the favorable effect due to the addition of water and the specific temperatures in the present invention can be obtained only when a titanium compound is employed as a catalyst. Stated definitely, the presence of water, the specific temperatures and the employment of a titanium compound as a catalyst are essential requisites to obtain the desired N,N-dialkylformamides in high yield according to the process of this invention.

In carrying out the process of this invention, all or part of the by-products formed during the reaction may be recycled into the reaction system to effectively increase the yield of the desired N,N-dialkylformamide.

Examples of the alcohols which may be employed in the process of this invention include methanol, ethanol, n-propanol, isopropanol, n-butanol, isobutanol, and the like.

In the process of this invention, the reactants, namely hydrocyanic acid and the alcohol may each be employed from the beginning of the reaction in the full amount required for the desired reaction, or may be successively or stepwise supplied during the course of the reaction. Alternatively, these reactants may be employed in admixture with the recycling by-products. The alcohol is suitably employed in an amount ranging from 1.5-10 moles, preferably 1.8-4 moles per mole of the hydrocyanic acid. The amount of water to be present in the reaction should be moderate. The employment of too large an amount of water has an adverse effect on the reaction, for example, due to decomposition of the desired product and it is also undesirable to employ too little an amount of water since the advantageous effect of water would not be available. Thus, water may be employed in an amount of 0.1-10 moles, preferably 0.5-2 moles per mole of the hydrocyanic acid.

Examples of the titanium compounds which may be employed in the process of this invention inclue oxides, hydroxides, halides, nitrates, sulfates, oxalates, alkoxides and halogenoalkoxides of titanium as well as ammonium and amine salts of titanic acid and halogenotitanic acids. Representative examples of these titanium compounds are $TiO_2$, $TiO(OH)_2$, $Ti(OH)_4$, $TiF_4$, $TiBr_4$, $TiI_4$, $TiCl_3$, $TiCl_2$, $TiOSO_4$, $Ti_2(SO_4)_3$, $Ti(SO_4)_2$, $Ti(NO_3)_4$, $TiO(NO_3)_2$, $Ti(CO_2)_2$,

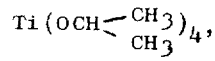

$TiCl(OC_2H_5)_3$, $(NH_4)_2TiO_3$, $(NH_4)_2TiCl_6$, $(CH_3NH_3)_2TiCl_6$ and the like. Preferred examples of the above-listed titanium compounds include hydroxides, halides, nitrates, alkoxides and halogenoalkoxides of titanium, ammonium chlorotitanate and amine salts of chlorotitanic acid.

Of the above-listed titanium compounds, titanium hydroxides are one of the more preferable catalysts since they can prevent the side reaction of hydrocyanic acid with the product and promote the reaction at relatively lower temperatures in the presence of water. However, these hydroxides give a relatively low reaction rate so that a long reaction period of time would be required for the completion of the reaction. On the other hand, halides, nitrates, alkoxides, halogenoalkoxides of titanium as well as ammonium chlorotitanate and amine salts of chlorotitanic acid give a high reaction rate for the production of the desired N,N-dialkylformamide, but they tend to somewhat promote side reaction of hydrocyanic acid with by-products so that the yield of the desired product would be, to some extent, reduced. In other words, a favourable effect obtained by conducting the reaction at relatively lower temperatures in the presence of water could be somewhat reduced. Then, in order to advantageously utilize only the favorable effects of these more preferred two groups of titanium compounds, there is proposed another embodiment wherein the titanium hydroxides are employed in admixture with other titanium compounds. More specifically, a mixture containing above 50 mole % of the titanium hydroxide shows a definitely favourable catalytic effect. In some cases, the use of such mixtures may cause the employed titanium compounds to be modified, accompanied by the generation of heat. However, such a mixture can be employed in the reaction. For instance, a mixture of titanium hydroxide with titanium tetrachloride tends to produce about 2 moles of hydrochloric acid, but may still be suitably employed. The two components of the aforesaid mixture may, of course, be separately employed in the reaction.

The catalytic activity of the titanium compound may sometimes be gradually reduced after prolonged use. In this case, such reduction of catalytic activity may often be accompanied by a side reaction, so that not only the yield of the desired N,N-dialkylformamide is reduced but also there are difficulties in the separation and purification of the desired product. Particularly, the reduced catalytic activity of a catalyst is detrimental in the case where a catalyst is employed in the form as supported on a carrier, e.g. silica gel. Thus, there is proposed a further embodiment that the titanium compound is employed in a form where it has been treated with an ammonium or methylamine salt of an inorganic acid. The titanium compound treated with the above-mentioned ammonium or methylamine salt has a remarkably prolonged catalytic activity and does not promote a side reaction such as polymerization of hydrocyanic acid, as compared with the untreated compound. A reduction in the catalytic activity, however, can not be avoided in such a treated titanium catalyst also if the treated catalyst is employed in the reaction for a considerably long period of time, but the initial high catalytic activity can be readily regenerated by treating the exhausted catalyst with the above ammonium or methylamine salt.

Analysis of the catalyst with a reduced catalytic activity by X-ray or infrared spectra shows a definite modification of its structure and form, but only a small degree of such modification is observed in the above-mentioned treated catalyst. It is believed that the prolonged effect of the treated catalyst depends upon the prevention of the modification of a catalyst. The mechanism of the prolonged catalytic activity obtained by treating with the ammonium or methylamine salt, which ammonium or methylamine salt itself shows as such only a little catalytic activity on the present reaction, is not fully understood, but it is believed that some interaction between the titanium compound and the ammonium or methylamine salt is induced. In some cases, not only the maintenance of a catalytic activity can be achieved, but also the productivity in the initial reaction period can be improved. In this connection, it should be noted that the above-mentioned advantages caused by the treatment with the ammonium or methylamine salt can be attained only in the case where the reaction is effected at temperatures of 150°–270°C. in the presence of water. Examples of the ammonium and methylamine salts of inorganic acids which may be employed in the above treatment include the ammonium salts and the mono-, di-, and trimethylamine salts of sulfuric, hydrochloric, nitric, phosphoric, carbonic, hydrocyanic, boric and thiocyanic acids. The treatment with the ammonium or methylamine salt may be suitably effected by dipping the titanium compound in an aqueous solution of the ammonium or methylamine salt followed by optional drying; or by flowing the reaction mixture together with a minor amount of the ammonium or methylamine salt into the reaction system.

The catalyst which may be employed in the process of this invention may be employed either dissolved or suspended in the reaction mixture. More preferably, the catalyst may be employed in the form as supported on a suitable carrier, e.g. silica gel. The amount of the catalyst to be employed is usually within the range of 0.01–20 mole %, based upon the hydrocyanic acid. Too small an amount of catalyst may accelerate a side reaction, while too large an amount of catalyst does not bring a further advantage. However, a greater amount of the catalyst may be advantageously employed if the catalyst is employed in the form as suspended in the reaction mixture or if the reaction system is sufficiently agitated, with exception of the case where the catalyst is employed in the form as supported on a silica gel or the like. It is preferable to employ the catalyst from the beginning of the reaction. The catalyst may also be employed in dissolved form or suspended in a feeding raw material. The catalyst may also be employed in such a manner that it is first dissolved or suspended in a suitable solvent such as water, methanol and the like and then charged into the reaction system. Some of the catalysts which may be employed in the process of this invention, for example, titanium tetrachloride, may immediately react with water or an alcohol to form a modified or converted one. In this case, the catalyst is sufficiently effective in such a modified form.

The process of this invention may be favourably conducted in a liquid or gaseous phase. The reaction temperature is critical and within the range of 150°–270°C. Alternatively, the reaction may be effected in two stages, that is to say, first at a temperature of 150°–200°C. until substantially all of the hydrocyanic acid disappears or is converted and subsequently at a temperature of 210°–270°C. to complete the reaction. The period of time of the first-stage reaction at 150°–200°C. may vary depending on the kind of catalyst employed. Yet, it is usually suitable to effect the first-stage reaction for about 20 minutes to 2 hours. The alternative procedure is advantageous from the commercial point of view because a side reaction of the hydrocyanic acid is further prevented. Disappearance of the hydrocyanic acid can be confirmed by various methods, e.g., IR spectrographic analysis and gas chromatographic analysis. In this alternative procedure, it is noted that the second-stage reaction at 210°–270°C. may be advantageously conducted after the charged catalyst is removed. Stated illustratively, the catalyst employed in the instant alternative process is remarkably effective in the first-stage reaction at 150°–200°C. Whilst, the catalyst is somewhat less effective in the second-stage reaction at 210°–270°C. and at the same time, tends to promote side reactions such as decomposition of the desired product, leading to a possible decrease in yield of the product. When the second-stage reaction at 210°–270°C. is conducted upon removal of the catalyst, the rate of formation of the desired N,N-dialkylformamide is reduced to some extent. Therefore, a relatively long period of time is required for completion of the reaction.

The reaction of the process of this invention may be affected by the type of material used for making the reaction vessel. For instance, if iron, SUS18, 27 or 32 or the like is employed, the yield of the desired N,N-dialkylformamide is reduced. Representative examples of the suitable materials are titanium, Hastelloy, zirconium, hard lead and glass. The use of such specific materials for the reaction vessel is effective for prevention of not only undesirable polymerization of the hydrocyanic acid but also decomposition of the product to gaseous materials.

The following examples are given solely for the purpose of illustrating of this invention, but they are nonlimitative.

EXAMPLE 1

Into an induction revolution stirring type autoclave (hereinafter referred to as an autoclave) made of titanium and having a capacity of 500 ml. were charged 27 g. of hydrocyanic acid, 64 g. of methanol, recycling materials of 236 g. of N-methylformamide and 9.0 g. of formamide, 30 g. of Ti(OH)$_4$ as a catalyst and 18 g. of water and then the air in the autoclave was replaced by nitrogen gas. The reaction was effected by heating at 230°C. for 2 hours with stirring. After cooling to room temperature, the autoclave was opened and the resulting reaction mixture, which was a nearly colorless, clear liquid, was subjected to distillation. After removal of fractions having low boiling points by distillation at atmospheric pressure, the residue was subjected to distillation under reduced pressure thereby to give 57.0 g.

(Yield in relation to the charged hydrocyanic acid: 78%) of N,N-dimethylformamide hereinafter referred to simply as "DMF"). The N,N-dimethylformamide so obtained has a boiling point of 88°–90°C./90 mmHg. Upon further distillation, 236 g. of N-methylformamide and 9.0 g. of formamide were recovered and, at the same time, 4.0 g. of N-methylformamide and 0.6 g. of formamide were obtained as by-products.

COMPARATIVE EXAMPLE 1

The same procedure as shown in the above Example 1 was repeated except that the water was omitted. The thus obtained reaction mixture was a brown-colored liquid, which was then distilled to give 28 g. (Yield in relation to the charged hydrocyanic acid: 38%) of N,N-dimethylformamide. The recycling materials were completely recovered.

EXAMPLE 2

The same procedure as shown in the above Example 1 was repeated except that each of the catalysts indicated in the following Table I was employed. The yield of N,N-dimethylformamide in each run is also shown in the following Table I.

COMPARATIVE EXAMPLE 3

The same procedure as shown in the above Example 1 was repeated except that the reaction was effected at 120°C. for 2 hours with stirring to give 2 g. (Yield in relation to the charged hydrocyanic acid: 2.7%) of N,N-dimethylformamide. The recycling materials were recovered.

EXAMPLE 3

The same procedure as shown in the above Example 1 was repeated except that the reaction was effected at 190°C. for 30 hours to give 61 g. (Yield in relation to the charged hydrocyanic acid: 84%) of N,N-dimethylformamide. Upon further distillation, 236 g. of N-methylformamide and 9.0 g. of formamide were recovered and, at the same time, 1.0 g. of N-monomethylformamide and 0.5 g. of formamide were obtained as by-products.

EXAMPLE 4

Into an autoclave made of titanium and having a capacity of 500 ml. were charged 27 g. of hydrocyanic acid, 64 g. of methanol, recycling materials of 177 g. of Table I

| Run No. | Catalyst | Amount of catalyst of (mole % to the hydrocyanic acid) | DMF Selectivity[1] In the presence of water | In the absence of water |
|---|---|---|---|---|
| 1 | Titanium oxide | 10 | 45 | 15 |
| 2 | Titanium tetrachloride | 3 | 78 | 34 |
| 3 | Titanium trichloride | 3 | 75 | 36 |
| 4 | Titanium oxalate | 5 | 75 | 39 |
| 5 | Isopropoxy titanate | 3 | 81 | 21 |
| 6 | Titanium (IV) sulfate | 10 | 72 | 21 |
| 7 | Titanium (III) sulfate | 10 | 70 | 20 |
| 8 | Titanium nitrate | 10 | 76 | 25 |
| 9 | Titanium oxynitrate | 10 | 73 | 25 |
| 10 | Ammonium titanate | 10 | 55 | 28 |
| 11 | Ammonium hexachlorotitanate | 3 | 81 | 38 |
| 12 | Hexachlorotitanic acid methylamine salt | 3 | 83 | 40 |
| Comparative Experiment | | | | |
| 1 | Zinc chloride | 5 | 38 | 39 |
| 2 | Zinc acetate | 5 | 30 | 32 |
| 3 | Ferric chloride | 5 | 33 | 35 |
| 4 | Ferric nitrate | 5 | 25 | 28 |

[1] DMF Selectivity is calculated according to the following equation:

$$\text{DMF Selectivity} = \frac{\text{DMF Produced (mole)}}{A - (B - C)} \times 100$$

A = hydrocyanic acid charged (mole)
B = Recycling materials obtained after the reaction (mole)
C = Recycling materials charged (mole)

COMPARATIVE EXAMPLE 2

The same procedure as shown in the above Example 1 was repeated except that the reaction was effected at 280°C. for 2 hours with stirring to give 38 g. (Yield in relation to the charged hydrocyanic acid: 62%) of N,N-dimethylformamide. Only 195 g. of the recycling materials were recovered and the balance, i.e. 50 g. not recovered. The generation of a large volume of gas was observed in the product.

N-methylformamide and 9.0 g. of formamide, a mixture of 12 g. of Ti(OH)$_4$ with 19 g. of TiCl$_4$ and 9.0 g. of water and then the air in the autoclave was replaced by nitrogen gas. The reaction was effected at 190°C. for 24 hours. The reaction mixture so obtained was subjected to distillation under reduced pressure to give 61 g. (Yield in relation to the charged hydrocyanic acid: 84%) of N,N-dimethylformamide. Upon further distillation, 177 g. of N-methylformamide and 9.0 g. of formamide were recovered and, at the same time, 2.0 g. of N-methylformamide and 0.8 g. of formamide.

EXAMPLE 5

The same procedure as in the above Example 1 was repeated except that 27 g. of hydrocyanic acid, 77 g. of methanol, recycling materials of 236 g. of N-methylformamide and 13.5 g. of formamide, 20 g. of TiO(OH)$_2$ as a catalyst and 4.0 g. of water were employed and the reaction was effected at 200°C. for 6 hours. There were obtained a yield of 57 g. (Yield in relation to the charged hydrocyanic acid: 78%) of N,N-dimethylformamide and completely recovered the recycling materials.

EXAMPLE 6

Into a glass ampoule having a capacity of 50 ml. were charged 2.7 g. of hydrocyanic acid, 6.4 g. of methanol, recycling materials of 23 g. of N-methylformamide and 1.4 g. of formamide, 10% by weight, based upon the whole solution, of the mixture indicated in the following Table 2 as a catalyst and 1.8 g. of water and then the ampoule was sealed. The ampoule was placed into a microbomb and an external pressure was applied thereto in order to avoid the breakdown of the ampoule owing to a reaction pressure. The microbomb was heated at 190°C. with stirring in an oil bath for 30 hours. The resulting mixture so obtained was analyzed by a gas chromatography under the conditions as defined below to determine N,N-dimethylformamide. The yields of N,N-dimethylformamide in relation to the charged hydrocyanic acid are summarized in the following Table II, and the recycling materials were similarly determined whereupon the complete recovery thereof was confirmed.

Determination conditions of gas chromatography:
Apparatus: Shimazu GC-2C (trade name).
Column: Glass column 3 m.
Packing: Porapack Q type, 80–100 mesh-size.
Thermostat temperature: 190°C.
Carrier gas: Hydrogen, 60 ml/min.
Inner standard. n-Butyronitrile.
Analysis: Cut area method.

Table II

| Catalyst | Mole ratio | Yield (%) |
|---|---|---|
| Ti(OH)$_4$<br>TiBr$_4$ | 1<br>0.9 | 83 |
| Ti(OH)$_4$<br>TiCl$_4$ | 1<br>0.5 | 80 |
| Ti(OH)$_4$<br>TiI$_4$ | 1<br>0.5 | 77 |
| Ti(OH)$_4$<br>TiCl$_2$ | 1<br>0.9 | 82 |
| Ti(OH)$_4$<br>Ti(SO$_4$)$_2$ | 1<br>0.9 | 73 |
| TiO(OH)$_2$<br>TiF$_4$ | 1<br>1 | 82 |
| TiO(OH)$_2$<br>TiOSO$_4$ | 1<br>0.2 | 80 |
| TiO(OH)$_2$<br>TiBr$_4$ | 1<br>0.8 | 79 |
| Ti(OH)$_4$<br>TiCl$_4$<br>TiBr$_4$ | 1<br>0.4<br>0.4 | 80 |
| Ti(OH)$_4$<br>Ti(OCH$<$CH$_3$/CH$_3$)$_4$ | 1<br>0.8 | 77 |
| Ti(OH)$_4$<br>Ti(NO$_3$)$_4$ | 1<br>0.8 | 83 |
| Ti(OH)$_4$<br>(NH$_4$)TiCl$_6$ | 1<br>0.8 | 88 |
| Ti(OH)$_4$<br>Ti(NO$_3$)$_4$ | 1<br>2 | 68 |
| Ti(OH)$_4$<br>(NH$_4$)$_2$TiCl$_6$ | 1 | 78 |

EXAMPLE 7

The same procedure as shown in the above Example 6 was repeated except that 10% by weight of each of the mixtures as indicated in the following Table III was empolyed. The yields of N,N-dimethylformamide in relation to the charged hydrocyanic acid are also shown in the following Table III.

Table III

| Catalyst | Mole ratio | Yield (%) |
|---|---|---|
| Ti(OH)$_4$ | 1 | 70 |
| TiCl$_4$ | 1.2 | |
| Ti(OH)$_4$ | 1 | |
| TiBr$_4$ | 2 | 65 |

EXAMPLE 8

The feeding liquid was prepared which was composed of hydrocyanic acid; and 2 moles of methanol, 1 mole of water, and recycling materials of 4 moles of N-methylformamide and 0.2 moles of formamide, based upon 1 mole of the hydrocyanic acid.

On the other hand, 4 g. of of each of the compounds indicated in the following Table IV was dissolved in 6N hydrochloric acid together with the additive of ammonium salt of inorganic acid indicated below to make said compound supported on 20 g. of silica gel. After drying, the supported catalyst thus prepared was charged into a U-shaped reaction tube having an inner diameter of 10 mm. and a length of 1 m. and made of titanium.

The reaction tube was placed into an oil bath at 230°C., while the above feeding liquid was fed in the reaction tube through one end thereof by means of a plunger type quantitative pump. The equipment was so arranged that the reaction system was maintained under a pressure of 100 kg./cm$^2$ by means of a controlling valve attached ahead to a water-cooled condenser and the reaction mixture was drawn out of the reaction system. Then, a liquid phase flow reaction was conducted. The average retention time of the reaction mixture in the reaction tube was set at 2 hours.

The reaction was carried out under the above-depicted conditions and the yields of N,N-dimethylformamide after 4, 8 and 16 hours from the initiation of the reaction were determined.

The results are summarized in the following Table IV wherein the results of those controls without any additive are also shown.

Table IV

| Catalyst | Additive (g.) | Yield (%) | | |
|---|---|---|---|---|
| | | 4 hrs. | 8 hrs. | 16 hrs. |
| Ti(OH)$_4$ | NH$_4$Cl (2) | 83 | 78 | 70 |
| A mixture of 1 mole of Ti(OH)$_4$ with 1 mole of TiCl$_4$ | do. | 85 | 83 | 80 |
| do. | NH$_4$SCN (4) | 80 | 82 | 78 |
| do. | (NH$_4$)$_2$SO$_4$ (4) | 78 | 81 | 75 |
| do. | NH$_4$NO$_3$ (3) | 78 | 75 | 72 |
| TiO(OH)$_2$ | NH$_4$Cl (4) | 82 | 79 | 71 |
| Ti(OH)$_4$ | none | 80 | 72 | 55 |
| A mixture of 1 mole of Ti(OH)$_4$ with 1 mole of TiCl$_4$ | none | 85 | 77 | 68 |

EXAMPLE 9

Into an autoclave were charged 27 g. of hydrocyanic acid, 64 g. of methanol, 18 g. of water, 244 g. of recycling materials (235 g. of N-methylformamide and 9.0 g. of formamide) and a catalyst. The catalyst was prepared by dipping 15 g. of silica gel into titanium tetrachloride, washing with water and then drying together with 20 ml. of an 20% aqueous solution of the additive indicated in the following Table V in an evaporating dish on a water bath.

After the replacement of the air in an autoclave made of titanium and having a capacity of 50 ml. by nitrogen gas, the reaction was effected at 200°C. for 20 hours. Then, the reaction mixture was treated in the same manner as shown in the above Example 1.

On the other hand, the catalyst was repeatedly utilized in the reaction.

The yields of N,N-dimethylformamide in the first run and the fourth run utilizing the same catalyst are summarized in the following Table V.

Table V

| Additive | Yield (%) | |
|---|---|---|
| | 1st run | 4th run |
| NH$_4$Cl | 81 | 75 |
| (NH$_4$)$_2$CO$_3$ | 78 | 70 |
| NH$_4$Br | 80 | 71 |
| NH$_4$I | 76 | 68 |
| NH$_4$ClO$_4$ | 78 | 66 |
| (NH$_4$)$_2$B$_4$O$_7$ | 76 | 63 |
| NH$_4$CN | 72 | 58 |
| None | 68 | 32 |

EXAMPLE 10

Into an autoclave made of titanium and having a capacity of 300 ml. were charged 27 g. of hydrocyanic acid, 64 g. of methanol, 18 g. of water and 10 g. of titanium tetrachloride and the air in the autoclave was replaced by nitrogen gas. The reaction mixture was heated with stirring at 160°C. for 2 hours. The autoclave was placed into a bath, which has previously been maintained at 240°C., and heated with stirring for further 2 hours. After cooling to room temperature, the autoclave was opened and the resulting mixture was subjected to distillation to give 36.5 g. (Yield in relation to the charged hydrocyanic acid: 50%) of N,N-dimethylformamide. Further distillation gave some N-methylformamide and formamide as by-products.

EXAMPLE 11

The same procedure as shown in the above Example 10 was repeated except that the reaction temperature was constantly maintained at 240°C. and the reaction period was 2 hours to give 22 g. (Yield in relation to the charged hydrocyanic acid: 30%) of N,N-dimethylformamide.

EXAMPLE 12

Into an autoclave made of titanium and having a capacity of 300 ml. were charged 13.3 g. of hydrocyanic acid, 32 g. of methanol, 9.0 g. of water, 122.5 g. of recycling materials (118 g. of N-methylformamide and 4.5 g. of formamide) and 6.0 g. of titanium hydroxide as a catalyst. After the air in the autoclave was replaced by nitrogen gas, the reaction was effected with stirring at 180°C. for 1 hour. After cooling to 0°C., the autoclave was opened and the catalyst was removed by filtration from the reaction mixture. Then, the filtrate was again charged into the autoclave and the reaction was effected with stirring at 250°C. for additional 1 hour to give 32 g. (Yield in relation to the charged hydrocyanic acid: 88%) of N,N-dimethylformamide. The recycling materials initially added were completely recovered.

EXAMPLE 13

The same procedure as in the above Example 12 was repeated except that the whole reaction was effected with stirring at 250°C. for 1 hour to give 27 g. (Yield in relation to the charged hydrocyanic acid: 74%) of N,N-dimethylformamide.

EXAMPLE 14

Into a glass ampoule having a capacity of 20 ml. were charged 2.7 g. of hydrocyanic acid, 9.2 g. of ethanol, 1.8 g. of water and 4 mole % (in relation to the hydrocyanic acid) of titanium tetrachloride. The mixture was then reacted at a temperature of 200°C. for 20 hours, and determination of N,N-diethylformamide was conducted according to the method as mentioned in Example 6. The yield of N,N-diethylformamide was 28 mole % in relation to the charged hydrocyanic acid.

On the other hand, for the comparative purpose, the above-mentioned reaction was carried out except that the water was not employed. The yield of N,N-diethylformamide was 20 mole % in relation to the charged hydrocyanic acid.

EXAMPLE 15

Into a glass ampoule having a capacity of 20 ml. were charged 2.7 g. of hydrocyanic acid, 6.4 g. of methanol, 1.8 g. of water and a catalyst as indicated in Table VI, which were reacted at 200°C. for 5 hours in the same manner as shown in Example 6. Determination of N,N-dimethylformamide was then conducted similarly to Example 6. The yield (in relation to the charged hydrocyanic acid) of N,N-dimethylformamide in each run is shown in the following Table VI.

For the comparative purpose, the same procedure was repeated carried with exception that the water was omitted. The results are also shown in the Table VI.

Table VI

| Run No. | Catalyst | Amount of Catalyst (mole % in relation to the hydrocyanic acid) | Yield of DMF (%) In the presence of water | In the absence of water |
|---|---|---|---|---|
| 1 | Ti(OH)$_4$ | 15 | 32 | 18 |
| 2 | TiCl$_4$ | 10 | 35 | 22 |
| 3 | Ti(OH)$_4$ ( TiCl$_4$ | 5<br><br>5 | 41 | 20 |

What is claimed is:

1. In the process for the preparation of an N,N-dialkylformamide by reacting hydrocyanic acid with an alcohol represented by the formula:

ROH wherein R represents an alkyl group having 1 to 4 carbon atoms, and in the presence of a titanium compound selected from the group consisting of titanium hydroxides, titanium oxides, titanium halides, titanium sulfates, titanium nitrates, titanium alkoxides, titanium oxalates, ammonium and amine salts of hexahalogenotitanic acids and mixtures thereof, the improvement comprising conducting the reaction at temperatures of 150°–270°C., in the presence of water, said water being present at the time of the initiation of the reaction in the amount of 0.5–2.0 moles per mole of the hydrocyanic acid.

* * * * *